March 5, 1957 I. W. DILLON 2,784,286
ELECTRICAL APPARATUS FOR STERILIZING SOIL
Filed April 15, 1953
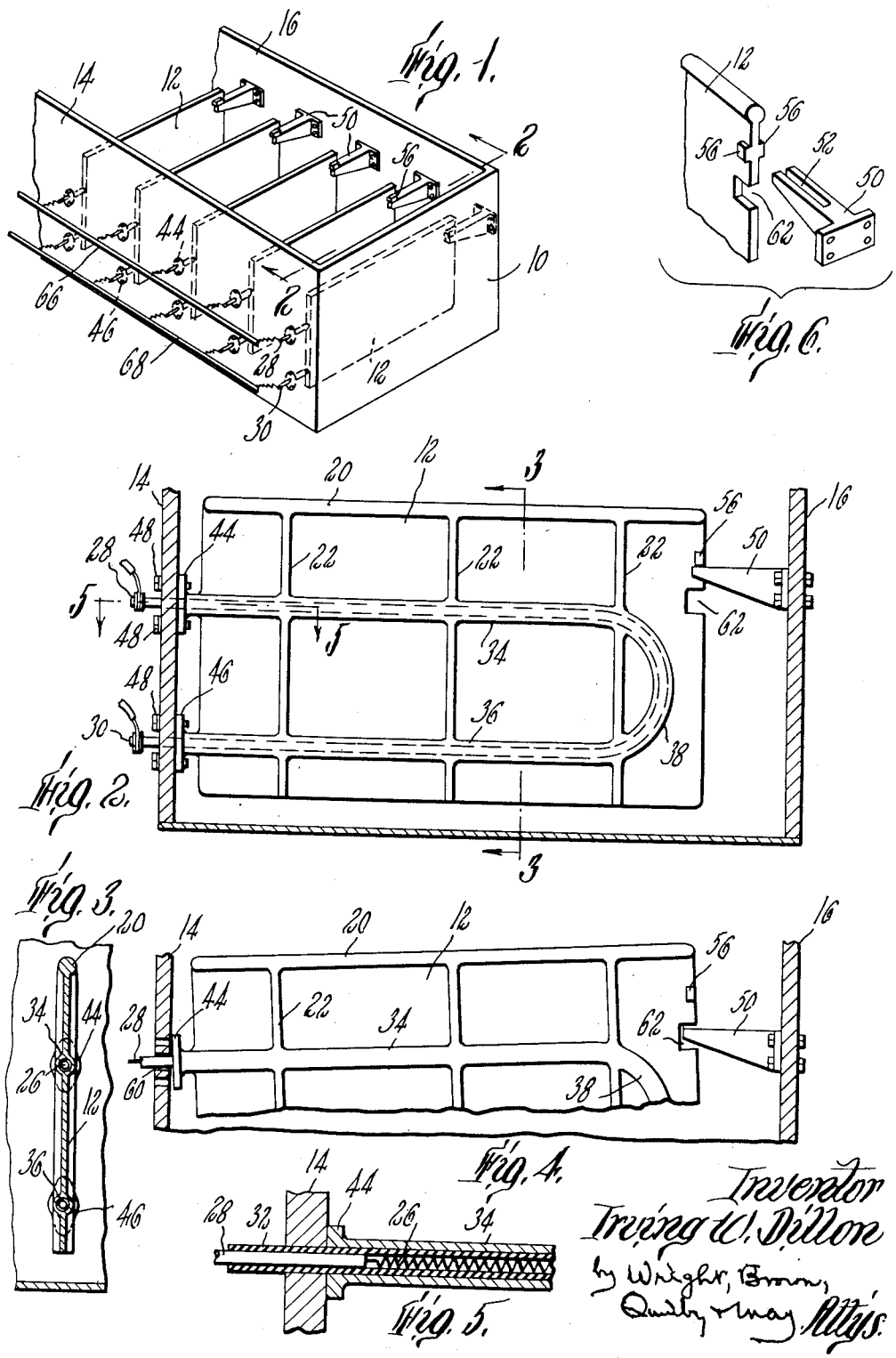
Inventor
Irving W. Dillon
by Wright, Brown,
Quinby & May Attys.

United States Patent Office 2,784,286
Patented Mar. 5, 1957

2,784,286

ELECTRICAL APPARATUS FOR STERILIZING SOIL

Irving W. Dillon, Melrose, Mass.

Application April 15, 1953, Serial No. 348,955

1 Claim. (Cl. 219—19)

This invention relates to apparatus for sterilizing soil by heating a quantity of soil to a predetermined temperature and maintaining such temperature for a predetermined period of time sufficient to destroy harmful bacteria and any chance seeds which may be present in the soil. An object of the invention is to provide means for producing heat and effectively distributing it through a quantity of soil in such a way as to avoid excessive local temperature in any part of the soil which might injure it by scorching the humus or breaking down chemical fertilizers which may be contained in the soil. It is a further object of the invention to provide apparatus that is rugged in structure so as to stand hard usage successfully. For this purpose a number of metallic plates are mounted in parallel array in a suitable box or container, each plate having an electrical heating element embedded therein to supply heat for soil which is put in the box in the spaces between the plates. The plates are independently mounted so that they can be individually removed and replaced. The plates are also mounted in such a way that they expand and contract thermally with no injury to themselves or to the container in which they are mounted.

For a more complete understanding of the invention reference may be had to the following description thereof and to the drawing, of which—

Figure 1 is a fragmentary perspective view of apparatus embodying the invention;

Figure 2 is a section on the line 2—2 of Figure 1;

Figure 3 is a section on the line 3—3 of Figure 2;

Figure 4 is a fragmentary sectional view similar to Figure 3, but showing the plate in a different position;

Figure 5 is a section, on a larger scale, taken on the line 5—5 of Figure 2; and Figure 6 is a fragmentary perspective view of a bracket and the portion of a plate which interengages therewith.

A container 10 is employed to hold earth or soil to be sterilized by heat. This container may be of any suitable size, shape and material, a rectangular shape being shown. Within the container 10 a series of parallel heating plates 12 are carried by and extend between opposing walls 14 and 16 of the container.

Each plate 12 is preferably of cast metal which is not too corrodible but is a good heat conductor, aluminum being acceptable. Each plate comprises a relatively thin web of metal having a thickness of ¼" or so. The web is reinforced by a top rib 20 of any desired cross-sectional shape such as the bulb shown in Figure 3, also a suitable number of vertical stiffening ribs 22 which extend down from the top rib 20 to the bottom edge. A heating element is embedded in the plate to impart heat to the same. The heating element may comprise a coil 26 of resistance wire connected at its ends to conductors 28 and 30 and encased in a covering 32 of insulation of a type not injuriously affected by high temperatures. As shown, the heating unit is arranged with two horizontal portions 34 and 36 connected by a curved portion 38, the whole being cast into the plate so that there is intimate contact between the heating unit and the metal of the plate to promote conduction of heat from the unit through the webs and ribs to the soil in contact therewith. The metal which is cast around the heating unit constitutes a tubular rib which adds materially to the mechanical strength and stiffness of the plate as a whole. The end portions of this tubular rib extend out beyond the edge of the plate, as at 40 and terminate in integral plates 44 and 46 which are in a common plane. These plates are preferably oval and are drilled and tapped to receive bolts 48 by which the plate is secured to the wall 14 as hereinafter described.

On the wall 16 a series of brackets 50 are bolted or otherwise secured, one such bracket being provided for each plate 12. Each bracket 50 is forked as indicated in Figure 6, the branches being separated by a slot 52 wide enough to receive a marginal portion of a plate 12. On each plate 12 are two oppositely projecting lugs 56 which may conveniently be formed when the plate is cast and which are at the end of the plate opposite from the end from which the heating element projects.

To mount a plate 12 in the box 10, the end portions 28 and 30 of the conductors which project beyond the plates 44 and 46 must be thrust through vertically spaced holes 60 which previously have been drilled through the wall 14. The plate is lowered into the box, the overall length of the plate, including the projecting conductors, being slightly less than the interior width of the box. The plate is then shifted edgewise to insert the conductors through the holes 60, the remote end of the plate being on one side or the other of the bracket 50. The plate is then tilted as shown in Figure 4 so as to bring a notch 62 in the edge of the plate below the lugs 56 on a level with the end of the bracket 50. The end of the plate is then swung slightly to bring the web of the plate into registry with the slot 52 and the end of the plate is lowered until the lugs 56 rest on the bracket and are slidable thereon so that elongation of the plate by thermal expansion is provided for. Bolts 48 are then thrust through suitable holes in the wall 14 and are screwed into the tapped holes in the plates 44 and 46. It is evident that by following these steps in the reverse order, a plate can readily be removed for repair or replacement.

The conductor terminals 28 of the several plates in a box may be connected to a bus bar 66, and the conductor terminals 30 may be connected to a bus bar 68, these bus bars being in a circuit containing a suitable source of electric power having a voltage equal to the rated voltage of the individual heating element, and a thermostatic controlling mechanism (not shown). The plates are uniformly spaced apart to diffuse the heat as uniformly as possible through the soil so that sterilization may be expeditiously effected without locally heating the soil at any point to objectionably high temperatures.

I claim:

Apparatus for sterilizing soil, comprising a container having opposed parallel walls, a series of relatively thin rectangular metal heating plates supported by said walls in parallel planes, each plate having an elongated heating unit embedded therein, a reinforcing bulb along the top edge thereof, and vertical ribs merging at their upper end with said bulb.

References Cited in the file of this patent

UNITED STATES PATENTS

| 1,514,858 | MacInnes | Nov. 11, 1924 |
| 1,709,645 | Woodson | Apr. 16, 1929 |
| 1,996,708 | Parsons | Apr. 2, 1935 |

FOREIGN PATENTS

| 667,402 | Great Britain | Feb. 27, 1952 |